Patented Feb. 22, 1938

2,109,164

UNITED STATES PATENT OFFICE 2,109,164

RUBBER COMPOSITION AND METHOD OF PRESERVING RUBBER

Albert M. Clifford, Cuyahoga Falls, Ohio, assignor to Wingfoot Corporation, Wilmington, Del., a corporation of Delaware No Drawing. Application October 22, 1932, Serial No. 639,151

2 Claims. (Cl. 18—50)

This invention relates to the retarding of the ageing of deteriorable organic compositions; more particularly, to the use in rubber, balata, gutta percha, transformer oils, gasoline and other deteriorable organic compositions of age retarders or antioxidants of the kind hereinafter set forth. The substances to which the invention relates have been found by actual test to protect against deterioration from such influences as heat, light and oxygen. They have also been found in the case of rubber to materially enhance the resistance to deterioration by flexing. In general they accomplish various desirable ends, among them, in the case of rubber, that of imparting improved tensile strength to the treated product and, in the case of gasoline, of preventing the formation of gums and gummy materials.

Substances which may be employed as antioxidants in accordance with the teachings of the present invention are, or may be regarded as, primary, secondary, and tertiary amines of the type formula $(R_1).N.(R).X.(R_2)$ wherein (R) is an alkyl, aryl or aralkyl radical attached by either a single or double bond to N and by a single bond to X, such radical being preferably unsubstituted, but having, if desired, hydroxy, amino, nitro, halogen, alkoxy, aryloxy, aralkoxy or other substituents. Thus (R), where substituted, may be called an organic radical, and, where unsubstituted, a hydrocarbon group. In the formula, X represents oxygen, sulfur, selenium or tellurium, all of which are members of Group VI of the Periodic System, and N stands, as preferred, for a single nitrogen atom or for the nitrogen-containing group

Groups $(R_1)$ and $(R_2)$ embrace radicals selected from a class consisting largely of alkyl, aryl, aralkyl; halogen alkyl, halogen aryl, halogen aralkyl; nitro alkyl, nitro aryl, nitro aralkyl; amino alkyl, amino aryl, amino aralkyl; hydroxy alkyl, hydroxy aryl, hydroxy aralkyl; alkoxy alkyl, alkoxy aryl, alkoxy aralkyl; aryloxy alkyl, aryloxy aryl, aryloxy aralkyl and like radicals and, in the case of $(R_1)$, of hydrogen as well. Except where (R) is attached to N by two bonds and, further, where N represents the nitrogen-containing group

conditions under which Group $(R_1)$, like Group $(R_2)$, can embrace one and only one univalent radical, Group $(R_1)$, may consist either of one bivalent radical or of two univalent radicals, the latter, where present, being either like or unlike each other. Group $(R_2)$ may be a heterocyclic radical, differing in this respect from Group $(R_1)$; but the latter, as is also true of (R), may represent a bivalent hydrocarbon chain constituting a part of a nitrogen-heterocyclic radical embodying N where the latter is a single nitrogen atom. Within these limits $(R_1)$ and $(R_2)$ may be either like or unlike; i. e., they may be composed, as the case may be, of radicals which are entirely like each other, which are partly like each other, or which are wholly unlike each other.

Examples of compounds falling within the type formula given above are dicyclohexyl amino chlorphenyl tolyl ether, wherein Group $(R_1)$ includes the two univalent cyclohexyl radicals, Group $(R_2)$ is made up of the tolyl nucleus, (R) is the chlorphenyl radical, and X is oxygen; p-ethoxy phenyl naphthyl nitrosamine, wherein N is the group

Group $(R_1)$ is the naphthyl radical, Group $(R_2)$ is the ethyl radical, X represents oxygen and (R) is the phenyl nucleus; p-amino tolyl di-ethyl ether, wherein Group $(R_1)$ consists of two hydrogen atoms, X is oxygen, and (R) and Group $(R_2)$ represent ethyl radicals; 1-methoxy 4-piperidyl benzene, wherein (R) is the benzene ring, X and $(R_2)$ are respectively the oxygen and methyl radical of the methoxy group, N is the heterocyclic nitrogen atom, and $(R_1)$ is the bivalent hydrocarbon chain which, with the heterocyclic nitrogen atom, makes up the piperidyl group; and p-methoxy pipecoline, wherein Group $(R_1)$ consists of a single hydrogen atom, N is the heterocyclic nitrogen atom, (R) is the hydrocarbon part of the pipecoline nucleus, X stands for oxygen and Group $(R_2)$ is the methyl radical of the methoxy substituent.

Falling within the scope of the invention are, for example, para phenoxy diphenyl amine, para para' dibutoxy diphenyl amine, N-tolyl phenetidine, 2-methyl 4-methoxy diphenylamine, 2-4-diamino 4' butoxy diphenyl amine, para hydroxy para' methoxy diphenyl amine, para hydroxy para' ethoxy diphenyl amine, 3-amino 4-methoxy diphenyl amine, 3-ethyl 4-methoxy diphenyl amine, 3-methoxy 4-hydroxy 4' hydroxy diphenyl amine, N-phenyl phenetidine, 3-methoxy 3' hydroxy diphenyl amine, 2-4-diamino 4-hydroxy diphenyl ether, 3-chlor 4-methoxy 4' hydroxy diphenyl amine, 3-chlor 4-butoxy diphenyl amine, 3-nitro 4-methoxy diphenyl amine, 3-ethoxy 4-hydroxy diphenyl amine, 3-ethoxy 4-hydroxy ditolyl amine, p-ethoxy phenyl anthracyl amine, methoxy phenyl tolyl amine, etc.

Others are 3' methyl 4-phenoxy diphenyl amine, 3' ethyl 4-phenoxy diphenyl amine, 3' methyl 2-4-dibutoxy diphenyl amine, p' ethoxy p' ethyl diphenyl amine, p-methoxy p' methyl diphenyl amine, 2-2' diamino 4-4' di bromphenyl ether, 2-4-ditoloxy diphenyl amine, 2-4-dihydroxy 4' methoxy diphenyl amine, N-xylyl phenetidine, 2-4 dihydroxy 4' ethoxy diphenyl amine, 2-4 dihydroxy 6-methyl 4' toloxy diphenyl amine, N-naphthyl phenetidine (alpha and beta), 4-4' ditoloxy 2-2' dimethyl diphenyl amine, 4-4' dimethoxy 2-2' tetra methyldiamino diphenyl amine, 4-4' dihydroxy 2-2' diethoxy diphenyl amine, 2-2' dihydroxy 4-4' diethoxy diphenyl amine, 4-4' dihydroxy 2-2' dimethoxy diphenyl amine, 2-4-diamino 4' hydroxy phenyl tolyl ether, 4-4' diphenoxy 2-2' dichlor diphenyl amine, 2-2' diamino 4-4' dichlor diphenyl ether and 2-6-dimethyl 2'6' diamino diphenyl ether.

Still others are 4-4' dimethoxy 3-5-dimethoxy diphenyl ether, 4-hydroxy 3-5-dimethoxy dixylyl amine, 4' ethoxy 3-5-dimethyl diphenyl amine, N N' dichlorethyl diamino diphenyl ether, 4-hydroxy 4' amino diphenyl ether, 4-hydroxy 4' dimethyl amino diphenyl ether, 4-amino 4' chlor diphenyl ether, 4-4' diethoxy ditolyl amine, 4-xyloxy phenyl beta naphthyl amine 4-ethoxy phenyl alpha naphthylamine, p-methoxy phenyl 1-8-dimethyl beta naphthylamine, p-hydroxy phenyl 2-7-ethoxy alpha naphthylamine, 4-methoxy 2-methyl phenyl beta naphthylamine, 4-phenoxy 2-6-dimethyl phenyl beta naphthyl amine, 4-phenoxy 2-methyl diphenyl amine, 2-4-6-trimethoxy phenyl alpha naphthyl amine, 2 methoxy (para hydroxy anilino) 1-4-naphthoquinone, 2-methoxy (para toluidino) 1-4-naphthoquinone, 4-amine 4' tolyl diphenyl ether, and 4-toloxy 4' butyl diphenylamine.

Also falling within the scope of the invention are 2-2' amino 4-4' diethyl diphenyl ether, naphthoxy methyl dimethyl amine (alpha and beta), 4-hydroxy phenyl piperidyl ether, naphthoxy ethyl dimethyl amine, methyl amino diphenyl ether, 2-amino 2' 4' dichlor diphenyl ether, phenoxy naphthyl methyl amine, phenoxy naphthyl anthracyl amine, naphthoxy naphthyl dimethyl ether (alpha and beta), 1-8 dimethoxy dibeta naphthyl ether, p-hydroxy p' methyl amino diphenyl ether, p-hydroxy p' dimethyl amino diphenyl ether, p-amino phenyl tolyl ether, p-butoxy p' methyl ditolyl amine, p-butoxy p' ethyl diphenyl amine, p-methoxy p' di isopropyl diphenyl amine, 2-nitro 4-amino diphenyl ether, p-methoxy p' methyl dinaphthylamine, p p' diamino phenyl xylyl ether, p-hydroxy diphenyl amine, p p' dihydroxy diphenyl amine.

Methoxy phenyl naphthylol amine (alpha and beta), ethoxy naphthyl phenylol amine (alpha and beta), methoxy naphthyl phenylol amine, (alpha and beta), 7 (tolyl amino) 2-methoxy naphthalene, 7 (xylyl amino) 2-methoxy naphthalene, 2 (tolyl amino) 1-methoxy naphthalene, 2 (xylyl amino) 1-methoxy naphthalene, methoxy phenyl naphthylol nitrosamine (alpha and beta), methoxy phenyl naphthylol methyl amine (alpha and beta), phenylol naphthyl methoxy phenyl amine (alpha and beta), p-butoxy phenyl tolyl amine, p-butoxy phenyl xylylamine, p p' butoxy diphenyl amine, p-methoxy phenyl tolyl nitrosamine, p-ethoxy phenyl xylyl amine, p-ethoxy phenyl p p' dinaphthyl amine (alpha and beta) p p' dimethoxy ditolyl amine, p-methylamino phenyl p' hydroxy biphenyl ether, p-methylamino phenyl p' ethoxy biphenyl ether, p-methylamino hydroxy phenyl tolyl ether, chlor phenyl amino diethyl ether, p-phenyl amino chlor phenyl biphenyl ether, p-phenyl amino bromphenyl biphenyl ether.

Also, N-butyl p-amino phenol, N-methyl p-amino phenol, N-isopropyl o-amino m-cresol, N-ethyl o-amino m-cresol, N-diethyl p-amino phenol, N-isobutyl p-amino phenol, N-amyl p-amino catechol, N-isoamyl p-amino phenol, N-cyclohexyl p-amino phenol, p-hydroxy phenyl ethyl amyl amine, N-methyl cyclohexyl p-amino phenol, N-hydroxy butyl m-amino phenol, N-hydroxyethyl m-amino phenol, N-hydroxy propyl m-amino phenol, N-allyl m-amino phenol, p-ethoxy diphenylamine, p p' diethoxy di tolylamine, o-ethoxy diphenylamine, m-ethoxy diphenylamine, p-ethoxy phenyl naphthylamine, p-ethoxy phenyl tolyl amine, tolyl aminoethyl naphthol, xylyl amino ethyl naphthol, ditolyl dianisidine, dixylyl dianisidine, etc.

Also, p-ethoxy p' isopropyl diphenylamine, p-isopropyl phenyl amino di (biphenyl) ether, ethoxy phenyl toluidine, mono naphthyl diamino ditolyl ether, p p' diethoxy diphenyl nitrosamine, methoxy diphenylamine, amyloxy diphenylamine, butoxy ditolyl amine, phenoxy ditolyl amine, p-tolyl amino p' dimethyl amino diphenyl ether, dianisyl diamino dimethyl ether, diphenyl diamino diethyl ether, p-tolyl amino diphenyl ether, p-naphthylamino ditolyl ether, p p' di (tolyl amino) diphenyl ether, o o' di (tolyl amino) diphenyl ether, diphenylol diamino dibenzyl ether, ditolyl diamino dibutyl ether, dibeta napthyl diamino ditolyl ether, etc.

Typical of compounds in which a sulphur, selenium or tellurium atom replaces the oxygen in the compounds mentioned above are p-methyl amino phenyl tolyl selenide, p-methylamino phenyl hydro selenide, p-dimethyl amino tolyl beta naphthyl selenide, p-isopropyl amino phenyl hydro selenide, p-cyclohexyl amino phenyl hydro selenide, p-amino chlorphenyl beta naphthyl selenide, p-methyl amino phenyl tolyl telluride, p-methyl amino phenyl hydro telluride, p-dimethyl amino tolyl beta naphthyl telluride, p-iso amyl amino phenyl hydro telluride, p-cyclohexyl amino phenyl hydro telluride, p-amino chlorphenyl beta naphthyl telluride, etc. It is obvious that in addition to the specific compounds listed above there are selenium and tellurium counterparts for each of the oxygen compounds herein disclosed; also, that there are corresponding sulphur compounds for the various oxygen, selenium and tellurium compounds enumerated.

In general, methods for preparing the antioxidants described above will suggest themselves. For instance, para hydroxy diphenyl amine may be prepared by adding 1 mol. of undissolved hydroquinone to a mixture of 4 mols of aniline and 2 mols of calcium chloride in the absence of any solvents other than the aniline itself. The material is heated for a period of 8 to 10 hours at a temperature of 150–160 degrees C. after which the product, containing para hydroxy diphenyl amine and diphenyl p-phenylene diamine, is steam distilled in order to remove excess aniline. It is then further purified by recrystallizing from benzene or alcohol. The para hydroxy diphenyl amine portion, melting at 69–70 degrees C., is obtained in good yield.

Para para' dihydroxy diphenyl amine may be prepared similarly by reacting in the absence of solvents equimolecular quantities of hydroquinone, para amino phenol and calcium chloride in an autoclave for a period varying from 5 to 8 hours at a temperature of approximately 175 degrees C. The product, para para' dihydroxy diphenyl amine, is treated with a little hydrochloric acid and boiled with water after which it is passed through a filter in order to remove any undissolved residues and is then precipitated by the addition of an excess of common salt. The precipitate then dried is in the form of a bluish powder melting at a temperature ranging from 170–180 degrees C.

Another method of preparation of certain of these materials is that outlined in Berichte (1924), volume 27, page 23. In accordance with this method 1-amino 2-naphthol 4-sulfonic acid is obtained by treating alpho nitroso beta naphthol with a saturated solution of sodium bisulfite. This reaction causes a simultaneous reduction of the nitroso group to an amino group and the introduction of a sulfonic group in the 4-position of the naphthyl radical. The sulfonate thus formed may readily be oxidized by means of nitric acid to form 1-2-naphthoquinone 4-sulfonic acid

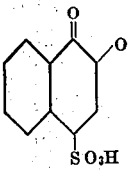

which upon being treated with potassium chloride forms a potassium salt. The potassium salt is then reacted in mol. per mol. ratio with aniline in aqueous solution, whereupon an anilido group is substituted for the sulfonate radical and 2-hydroxy 1-4-anilido naphthoquinone,

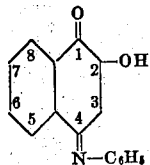

results. This compound is formed as a red precipitate, which upon being filtered from the reacting materials, gives a solid material having a melting point of about 240 degrees C., a compound in relatively pure form. For most purposes it is unnecessary to subject it to further purification.

Similarly, if in the above reaction para toluidine is substituted for aniline, the compound 2-hydroxy para toluidino 1-4-naphthoquinone having the formula

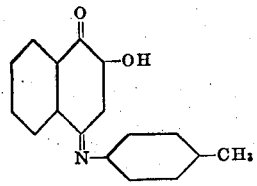

is obtained. Likewise if para amino phenol is substituted for aniline, 2-hydroxy para hydroxy anilino 1-4-naphthoquinone is formed. Also, the compound 1-2-dihydroxy 4-para hydroxy phenyl naphthylamine

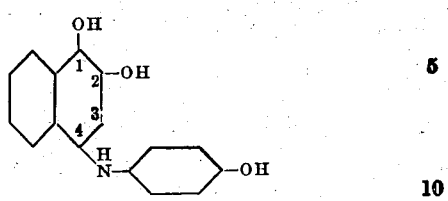

is obtained by interacting the potassium salt of 1-2-naphthoquinone 4-sulfonic acid with para amino phenol in the presence of an active reducing agent such as sodium hydrosulfite.

Others of the foregoing compounds may, of course, be prepared according to still other methods. Thus n-butyl p-amino phenol can be prepared by reacting butyl amine and p-chloro phenol in an autoclave; p-ethoxy phenyl alpha naphthyl amine, by reacting p-phenetidine with alpha naphthol; n-isopropyl o-amino m-cresol, by interacting o-amino m-cresol, acetone and formic acid; and naphthoxy methyl dimethyl amine, by treating beta naphthol dissolved in alcohol with dimethyl amine and formalin. Still other methods which it is not necessary to describe in this application may be employed where circumstances permit, such methods being found in the literature of chemistry.

It is to be understood that the invention is not limited to any specific method of preparing the antioxidants or, regardless of illustrative references herein, to rubber. The antioxidants of the invention may be employed advantageously in substantially any of the standard rubber formulae, the following being one in which they have been found to give excellent results.

|  | Parts |
|---|---|
| Extracted pale crepe | 100 |
| Zinc oxide | 5 |
| Hexamethylene tetramine | 1 |
| Sulfur | 3 |
| Stearic acid | 1½ |
| Antioxidant | 1 |

As pointed out above, they may also be employed in transformer oils, gasoline, etc.

Rubber samples prepared in accordance with the foregoing formula were subjected to vulcanization for varying periods of time and then tested to ascertain their physical characteristics. One set from each type of stock was tested immediately for tensile strength and elasticity while a second set was subjected to ageing in a Bierer-Davis bomb for 6 days in oxygen at 50 degrees C. and 150 pounds per square inch. At the conclusion of the 6 day period the samples were removed from the bomb and subjected to physical tests corresponding to those conducted upon the unaged samples.

It is evident from the following tables that rubber compositions containing even small proportions of the antioxidants of this invention resist deterioration remarkably well. Similar compositions not containing the antioxidants upon being subjected to corresponding tests increase in weight in the neighborhood of 10% and lose almost all their tensile and elongation properties. In the following data the tests for para para' dihydroxy diphenyl amine and para hydroxy diphenyl amine were obtained from a rubber formula similar to that given above with the exception that the sulfur content was increased from 3 to 4 parts.

Para hydroxy diphenylamine

| Cure in mins. 40# | Original | | | | Aged | | | | Pct. wt. inc. |
|---|---|---|---|---|---|---|---|---|---|
| | Ult. tens. | Max. elg. | Load in kgs/cm² | | Ult. tens. | Max. elg. | Load kgs/cm² | | |
| | | | 500% | 700% | | | 500% | 700% | |
| 30 | 107 | 870 | 44 | ------ | 132 | 810 | 72 | ------ | 0.0 |
| 50 | 170 | 840 | 78 | ------ | 182 | 770 | 126 | ------ | 0.0 |
| 70 | 186 | 790 | 110 | ------ | 178 | 725 | 155 | ------ | 0.17 |

Para para' dihydroxy diphenylamine

| 50 | 125 | 835 | 20 | 62 | 140 | 815 | 23 | 74 | 0.3 |
| 70 | 160 | 815 | 26 | 86 | 145 | 765 | 31 | 103 | 0.4 |

2-hydroxy para toluidino 1-4-naphthoquinone

| 35 | 91 | 870 | 13 | 36 | 91 | 820 | 15 | 46 | 0.14 |
| 50 | 101 | 800 | 17 | 55 | 118 | 795 | 20 | 64 | 0.28 |
| 70 | 139 | 775 | 23 | 86 | 128 | 725 | 28 | 104 | 0.30 |

2-hydroxy (para hydroxy anilino) 1-4-naphthoquinone

| 35 | 82 | 875 | 12 | 33 | 108 | 840 | 16 | 48 | 0.01 |
| 50 | 109 | 840 | 16 | 49 | 121 | 810 | 19 | 64 | 0.03 |
| 70 | 133 | 780 | 24 | 53 | 129 | 745 | 26 | 96 | 0.05 |

1-2-dihydroxy 4-(para hydroxy phenyl) naphthylamine

| 35 | 80 | 900 | 10 | 27 | 102 | 865 | 15 | 42 | 0.02 |
| 50 | 110 | 840 | 14 | 48 | 122 | 805 | 20 | 66 | 0.09 |
| 70 | 134 | 795 | 21 | 76 | 138 | 760 | 25 | 95 | 0.11 |

2-methyl 4-hydroxy diphenylamine

| 35 | 115 | 880 | 14 | 42 | 120 | 845 | 16 | 53 | 0.02 |
| 50 | 136 | 820 | 20 | 66 | 132 | 785 | 21 | 79 | 0.09 |
| 70 | 159 | 795 | 24 | 87 | 151 | 750 | 28 | 112 | 0.06 |

2-hydroxy 1-4-anilido naphthoquinone

| 30 | 100 | 900 | 11 | 32 | 85 | 815 | 14 | 44 | 0.20 |
| 50 | 135 | 865 | 17 | 54 | 125 | 790 | 21 | 75 | 0.28 |
| 70 | 165 | 805 | 24 | 90 | 130 | 730 | 29 | 111 | 0.54 |

Similar data have been obtained in the case of others of the compounds mentioned, for example, naphthoxy methyl dimethyl amine (dimethyl amino methyl beta naphthyl ether) and naphthoxy methyl diethyl amine (diethyl amino methyl beta naphthyl ether). Using the same formula, but with 4 parts of sulfur rather than 3 parts, the following results were obtained:

Dimethyl amino methyl beta naphthyl ether

| Cure | Original | | | | Aged | | | | Percent wt. inc. |
|---|---|---|---|---|---|---|---|---|---|
| | Tens. | Elg. | 500% | 700% | Tens. | Elg. | 500% | 700% | |
| 30/285 | 80 | 830 | 13 | 39 | 45 | 730 | 13 | 37 | .87 |
| 50 | 150 | 815 | 22 | 77 | 60 | 655 | 25 | ----- | 1.17 |
| 110 | 165 | 750 | 31 | 120 | 90 | 650 | 37 | ----- | 1.55 |

Diethyl amino methyl beta naphthyl ether

| 30/285 | 110 | 850 | 16 | 48 | 65 | 740 | 17 | 51 | .55 |
| 50 | 175 | 805 | 27 | 96 | 100 | 705 | 29 | 97 | .81 |
| 110 | 185 | 735 | 39 | 150 | 120 | 675 | 42 | ----- | 1.37 |

The following data came from similar tests on N-butyl p-amino phenol, N-isopropyl, o-amino m-cresol, N-methyl p-amino phenol, N-tolyl phenetidine and N-phenyl phenetidine, using the formula as first given:

N-butylamino phenol

| Cure | Original | | | | Aged | | | | Percent wt. inc. |
|---|---|---|---|---|---|---|---|---|---|
| | Tens. | Elg. | 500% | 700% | Tens. | Elg. | 500% | 700% | |
| 35/285 | 162 | 840 | 19 | 20 | 144 | 780 | 23 | 91 | .06 |
| 50 | 165 | 765 | 27 | 112 | 134 | 725 | 29 | 117 | .31 |
| 70 | 186 | 725 | 38 | 160 | 140 | 765 | 41 | ----- | .53 |

N-isopropyl o-amino m-cresol

| 35/285 | 115 | 850 | 14 | 47 | 126 | 745 | 26 | 96 | .71 |
| 50 | 140 | 780 | 23 | 85 | 143 | 680 | 40 | ----- | .19 |
| 70 | 161 | 755 | 28 | 112 | 152 | 645 | 55 | ----- | .28 |

N-methyl p-amino phenol

| 35/285 | 157 | 740 | 33 | 129 | 164 | 685 | 47 | ----- | .27 |
| 50 | 176 | 705 | 44 | 169 | 170 | 650 | 60 | ----- | .96 |
| 70 | 203 | 685 | 56 | ----- | 186 | 635 | 74 | ----- | .30 |

N-tolyl phenetidine

| 35/285 | 112 | 915 | 12 | 32 | 89 | 850 | 13 | 36 | .04 |
| 50 | 116 | 825 | 17 | 55 | 122 | 840 | 17 | 55 | .17 |
| 70 | 122 | 780 | 20 | 76 | 123 | 770 | 22 | 79 | .22 |

N-phenyl phenetidine

| 35/285 | 110 | 875 | 14 | 42 | 108 | 845 | 14 | 45 | .20 |
| 50 | 119 | 805 | 18 | 60 | 105 | 785 | 18 | 62 | .23 |
| 70 | 132 | 780 | 22 | 78 | 129 | 745 | 25 | 97 | .27 |

From the foregoing it is evident that the compounds herein disclosed are highly suitable as age resisters of rubber and other organic products which undergo deterioration under the influences of heat, light and oxygen. Not only do the compounds of the present invention counteract the effects of such influences, but they tend to impart other highly desirable qualities, such, for example, as increased resistance to deterioration by flexing.

It is to be understood that as hereinafter used the term "benzenoid" embraces phenyl and naphthyl groups, which, as preferred, do or do not contain substituents, such substituents being, for example, alkyl, alkoxy, amino and like groups. Also, by the term "rubber" it is meant to include rubber, latex, balata, gutta percha, guayule, rubber isomers, rubber conversion products and similar materials. It will be apparent that numerous changes may be made in the procedure to be followed and the chemicals employed without departing from the inventive concept. It is intended that the patent shall cover, by suitable expression in the appended claims, whatever features of patentable novelty reside in the invention herein disclosed.

What I claim is:

1. The method of preserving rubber which comprises treating the same with p-ethoxy phenyl naphthyl nitrosamine.

2. A rubber composition comprising rubber and p-ethoxy phenyl naphthyl nitrosamine.

ALBERT M. CLIFFORD.